US006205698B1

United States Patent
Richards

(10) Patent No.: US 6,205,698 B1
(45) Date of Patent: Mar. 27, 2001

(54) FISHHOOK REMOVER AND METHOD

(76) Inventor: David M. Richards, 1300 Seminole, Apt. 25, West Plains, MO (US) 65775

( * ) Notice: Subject to any disclaimer, the term of this patent is extended or adjusted under 35 U.S.C. 154(b) by 682 days.

(21) Appl. No.: 08/743,521

(22) Filed: Nov. 4, 1996

Related U.S. Application Data

(63) Continuation-in-part of application No. 08/546,442, filed on Oct. 20, 1995, now abandoned.

(51) Int. Cl.[7] .................................................. A01K 97/00
(52) U.S. Cl. ............................................................. 43/53.5
(58) Field of Search ............................... 43/53.5; D22/149

(56) References Cited

U.S. PATENT DOCUMENTS

| | | | | |
|---|---|---|---|---|
| 2,561,281 | * | 7/1951 | Lawrence | 43/53.5 |
| 2,669,055 | * | 2/1954 | Doerr | 43/53.5 |
| 2,749,653 | * | 6/1956 | Patrowsky | 43/53.5 |
| 4,833,817 | * | 5/1989 | Silverthorn | 43/53.5 |

* cited by examiner

Primary Examiner—Kurt Rowan
(74) Attorney, Agent, or Firm—Jonathan A. Bay

(57) ABSTRACT

A fishhook remover and method are achieved by a remover tool that has a handle shaped like a pistol stock and a slender shank that extends away from the pistol-grip handle like a barrel. The slender shank terminates in an end substantially configured in a J-shape, but which also includes a fork that flares out in the direction opposite to the handle. In use, the fork of the tool is preferably inserted in an elbow portion of a fishhook to allow a user to push in the elbow and unhook the fish. The handle of the remover tool includes a lateral flange. The flange is arranged so that a user, gripping the handle like a pistol, can reach his or her thumb out and press it firmly against the flange. That way, a user can clamp fishing line between the flange and his or thumb, and thereby keep the elbow of the hook pulled tightly into the fork while maneuvering the tool. The J-shaped portion of the tool allows the user to catch the elbow of the hook like the way two links of chain contact each other. A fish can be unhooked by swinging the fish in an orbit in front of the chest of the user. During the swing of the fish, the fish comes unhooked somewhere past the top of the upswing. A fish can be unhooked by this method without the user ever directly touching the fish with his or her hands.

6 Claims, 4 Drawing Sheets

FISHHOOK REMOVER AND METHOD

CROSS-REFERENCE TO RELATED APPLICATION

This application is a continuation-in-part of non-provisional application no. 08/546,442, filed Oct. 20, 1995, now abandoned.

BACKGROUND AND SUMMARY OF THE INVENTION

The invention relates to a fishhook remover and a method for removing a fishhook from a fish mouth. The fishhook remover generally has an overall shape resembling a pistol, including a handle that is shaped like a pistol stock as well as a barrel-like shank that terminates away from the handle in a J-shaped end to catch or couple a curved section of the shank, or elbow of an embedded fishhook.

It is an object of the invention to provide a fishhook remover and method which allow unhooking a fish without inflicting any or but insignificant harm to the fish.

It is another object of the invention to provide a fishhook remover and method which eliminate the need to even touch the fish in order to unhook it, to thereby avoid disturbing a fish's protective slime layer.

It is a further object of the invention to achieve the above objects via a structure which is relatively easy and inexpensive to fabricate.

These and other aspects and objects are provided according to the invention in a fishhook remover and a method of use that feature a remover tool that has a handle shaped like a pistol stock and a slender shank that extends away from the pistol-grip handle like a barrel. The slender shank terminates in an end substantially configured in a J-shape, but which also includes a fork (eg., hence a "forked end") that flares out in the direction opposite to the handle. In use, the fork of the tool is preferably inserted in an elbow portion of a fishhook to allow a user to push in the elbow and unhook the fish.

The handle of the remover tool includes a lateral flange. The flange is arranged so that a user, gripping the handle like a pistol, can reach his or her thumb out and press it firmly against the flange. That way, a user can clamp fishing line between the flange and his or thumb, and thereby keep the elbow of the hook pulled tightly into the fork while maneuvering the tool.

The J-shaped portion of the tool allows the user to catch the elbow of the hook like the way two links of chain contact each other. A fish can be unhooked by swinging the fish in an orbit in front of the chest of the user. During the swing of the fish, the fish comes unhooked somewhere past the top of the upswing. A fish can be unhooked by this method without the user ever directly touching the fish with his or her hands.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIGS. 7, 8 and 9 are comparable perspective views showing a sequence of stop action views which with reference to FIG. 6 disclose various relative alignments between the fishhook remover and the fishhook as the fish is twirled in the orbit, wherein:

FIG. 7 corresponds to a given alignment between the fishhook remover and the fishhook for when fish dangles at rest in the six o'clock position shown by FIG. 6, FIG. 8 corresponds to a changed alignment between the fishhook remover and the fishhook for when fish has been twirled to about a twelve o'clock position of the orbit shown by FIG. 6, and, FIG. 9 corresponds to another change in the alignment between the fishhook remover and the fishhook as relative to soon after the fish has detached from the fishhook and fallen free as shown by FIG. 6.

DETAILED DESCRIPTION OF THE PREFERRED EMBODIMENTS

Figure 1:
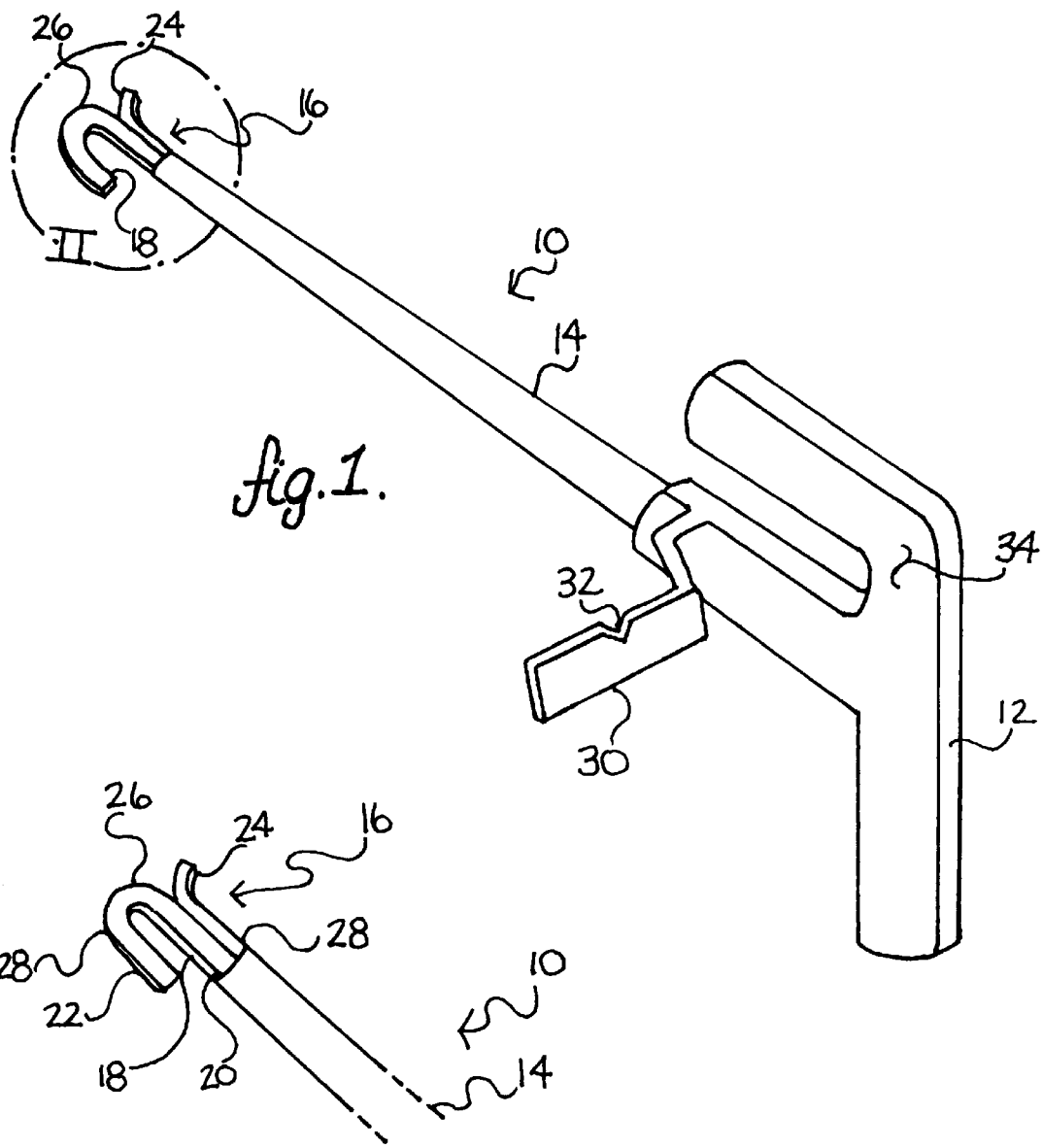
FIG. 1 is a perspective view of a fishhook remover in accordance with the invention.

FIG. 1 shows a fishhook remover 10 in accordance with the invention. The fishhook remover 10 has an overall shape which generally resembles a pistol, including a handle 12 shaped like a pistol stock as well as a barrel-like, elongated shank 14 that extends away from pistol-grip handle 12 to terminate in an end portion 16 that predominantly (but not exclusively) resembles a J-shape.

In this description, the axial direction along the shank 14 that extends away from the handle 12 is denominated as the "forward" direction. However, the term "forward" is relied upon merely for a given reference direction. This and other reference directions, such as "rearward" and the like, are used merely for convenience in this description, for relative orientation, and otherwise do not impose any limitations on the configuration or use of the invention.

Figure 2:
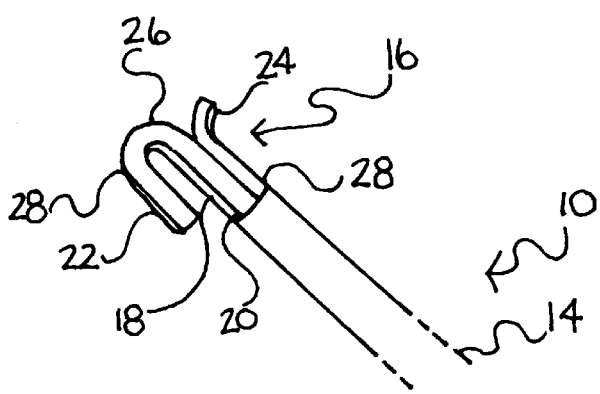
FIG. 2 is an enlarged view of detail II in FIG. 1.

As better shown by FIG. 2, the J-shaped portion 16 when examined up close forms a rearwardly opening U-shaped slot 18. The U-shaped slot 18 is relatively elongated and is defined between a pair of parallel sides 20 and 22, or "legs." The leg given reference numeral 22 is an outer leg relative to leg 22, it being the inner of the two legs. Inner leg 22 is actually a portion of the shank 14. The J-shaped portion 16 extends aside a spur 24. The J-shaped portion 16 and spur 24 together, between themselves, define a V-shaped forked end 26. The forked end 26 flares out in the forward direction.

The J-shaped portion 16 and the spur 24 are generally coplanar. If the pistol-grip handle is oriented normally in a vertical plane, then the plane containing the J-shaped portion 16 and spur 24 is transverse or perpendicular to the vertical or, that is, the plane of the J-shaped portion 16 and spur 24 extends horizontally.

Figure 3:
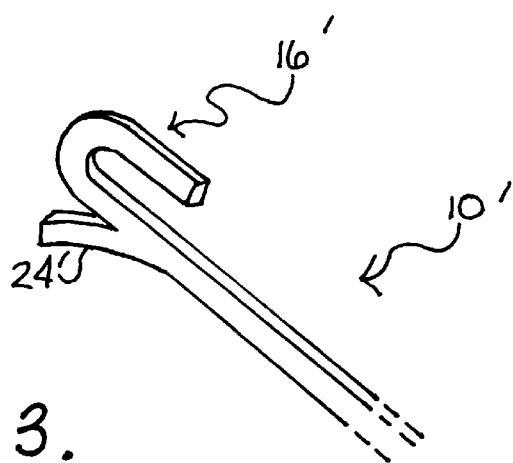
FIG. 3 is a view, comparable to FIG. 2, of an alternate embodiment of the fishhook remover, with portions broken away.

FIG. 3 shows an alternate embodiment of the fishhook remover 10'. It differs from the FIG. 1 version in that it has a J-shaped portion 16' and spur 24' that are coplanar with the pistol-grip handle (handle not shown in FIG. 3). To configure the remover tool 10' as shown by FIG. 3 would allow the remover tool 10' to be stamped out of flat sheet material such as aluminum or the like.

Whereas the version of the remover tool shown by FIGS. 1 and 2 is preferred for operability reasons, the FIG. 3 version is preferred for ease and economy of manufacture.

The FIG. 1 version of the remover tool 10 is not likely formed from sheet materials. The inventor hereof has built a prototype of the FIG. 1 version from by splicing two lengths of coat hanger wire to form the shank 14. More particularly, the shank 14 is constructed by splice of two pieces of coat hanger wire 28 that are (i) pre-bent into their desired shapes, and, (ii) lightly hammered partly flat to not only increase their stiffness, but also, to give them a square or rectangular cross-section, especially the right-angle edges. The two pieces of coat hanger wire can be spliced together via epoxy or the like, or else by brazing, soldering or welding and so on. Persons having ordinary skill in the art could opt for various other sufficient methods and materials to fabricate the fishhook remover 10,10' in accordance with the invention and still get suitably useful article or tool for the purpose.

In FIG. 1, the pistol-grip handle 12 includes a lateral flange 30. The lateral flange 30 is formed with a notch 32. The notch 32 generally serves as a guide for fishing line, as will be more particularly described below. The flange 12 is arranged for a user, who has grabbed the handle 12 with his or her right hand, to rest his or her thumb against (not shown, but see FIG. 4. Whereas FIG. 2 depicts a right-handed version of the remover tool 10 in accordance with the invention, ordinarily skilled persons could easily construct a left-handed or mirror opposite version of the FIG. 1 remover tool 10.

The handle 12, as well as portions of the shank 14 near the handle 12, are preferably given a rubberized coating 34 for comfort and improving the ability of user to grip the handle firmly.

Figure 4:
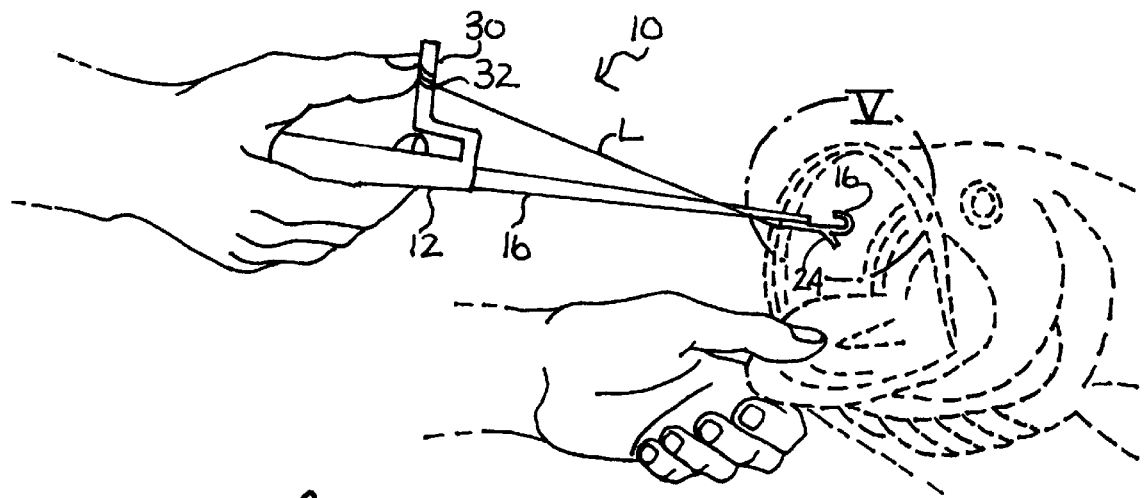
FIG. 4 is a reduced scale perspective view showing one method of use of the fishhook remover of FIG. 1, wherein a fish's mouth and a user's hands are included in the view for illustrative purposes only.
Figure 5:
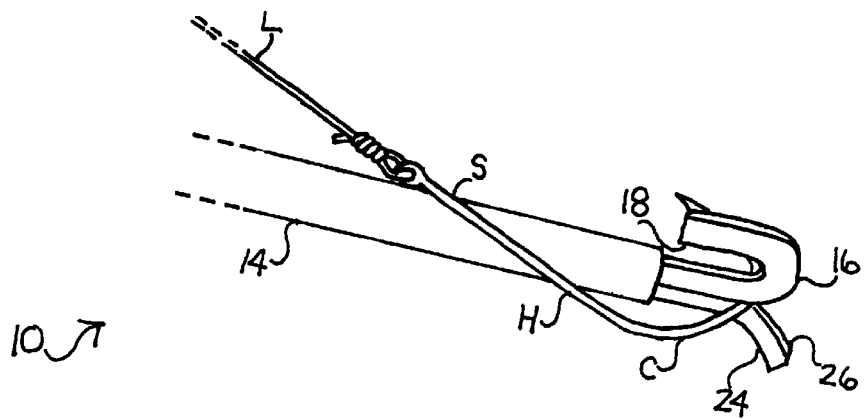
FIG. 5 is an enlarged view of detail V in FIG. 4.

FIGS. 4 and 5 illustrate one method of use of the fishhook remover 10. This method is preferred for relatively large fish and/or fish which are hooked deep in the mouth. Indeed, the fish specie shown in FIG. 4 is a largemouth bass, and it is illustrated hooked relatively deep in the mouth.

A deep-hooked fish is normally a problem. Most people do not have a small enough and to reach into the fish's mouth and remove the hook so as to not harm the fish. The remover tool 10 includes various inventive aspects to allow effective and safe hook removal from a fish hooked deep.

In use, it is taken as a given that, a fisherman user of the remover tool 10 has caught and landed a fish which he or she will hence unhook with the remover tool 10. The version of the remover tool 10 shown in FIG. 4 is a right-handed version. Thus, the fisherman is presumptively holding the holding the remover tool 10 in his or right hand, and the fish with the left hand. FIG. 4 shows the user clamping the fish's lower lip between his or thumb and clenched forefinger. The user is thus ready to maneuver the remover tool 10 as shown by FIGS. 4 and 5.

Aiming the end 16 of the tool 10 like a pistol, the user inserts the end 16 of the tool 10 into the fish's mouth to run it up against the hook H. FIG. 5 shows better what the user wants to accomplish. FIG. 5 shows, among other objects, a conventional fishhook H. This conventional hook H has a wire body that includes a shank portion S. The shank S extends between an eye to which an end of the fishing line L is tied, and a curved portion C, which forms approximately a half of a loop that terminates in a pointed end for the fishhook H. This curved portion C can also be termed "elbow."

The user aims or directs the forked end 26 of the tool 10 until it is rested in the elbow C of the hook H. The user then pulls the line tied to the hook H until taut, and lays the taut line L in the notch 32 of the flange 30, the end result of which is shown by FIG. 4. Alternatively, the user could start with laying the line L in notch 32 and after that, pull the line L tight while aiming the forked end 26 for the elbow c of the hook H. By either procedure, the end goal is to have the forked end 26 coupled to the hook's elbow C, as shown by FIG. 5.

The coupling between the forked end 26 and elbow C allows the user to apply an axial thrusting force on the hook H in the forward direction (i.e., in the direction down into the throat of the fish). This applied force on the hook H reverses the pointed end of the hook H out of fish tissue in which the hook H is embedded, and thereby unhook the fish.

Various inventive aspects of the remover tool 10 are directly advantageous for the particular use of the tool 10 that is shown by FIGS. 4 and 5 (other uses of the tool 10 will be described below with reference to FIGS. 6 through 9).

So, the flange 30 is arranged to allow a user grasping the tool 10, to reach his or her thumb out and press it against the flange 30. That way, the user can clamp the fishing line L firmly in the notch 32 and/or against the flange 30 with his or thumb while otherwise maintaining a firm pistol grip on the tool handle 12. The user can therefore keep that much of the fishing line L between the hook H and the flange 30, under sufficient tension to keep the hook elbow C securely within the forked end 26. This is advantageous because, the user can combine thrusting pushes on the hook elbow C with forceful twists by rotating his or her wrists. Combining thrusts with twists is highly effective in dislodging hard to remove hooks. Combined thrusts and twists are, practically speaking, only effective if the forked end and elbow 26 and C remain tightly coupled together. A user keeps the forked end and elbow 26 and C tightly coupled together via his or her thumb clamping the fishing line L on the flange 30.

Additionally, after the user has dislodged the hook H from the fish tissue, the user is able to carefully guide the hook H out of the mouth, and avoid re-hooking the fish in another place, because the hook elbow C is held tight in the forked end 26 by the thumb clamping the line L on flange 30.

Figure 6:
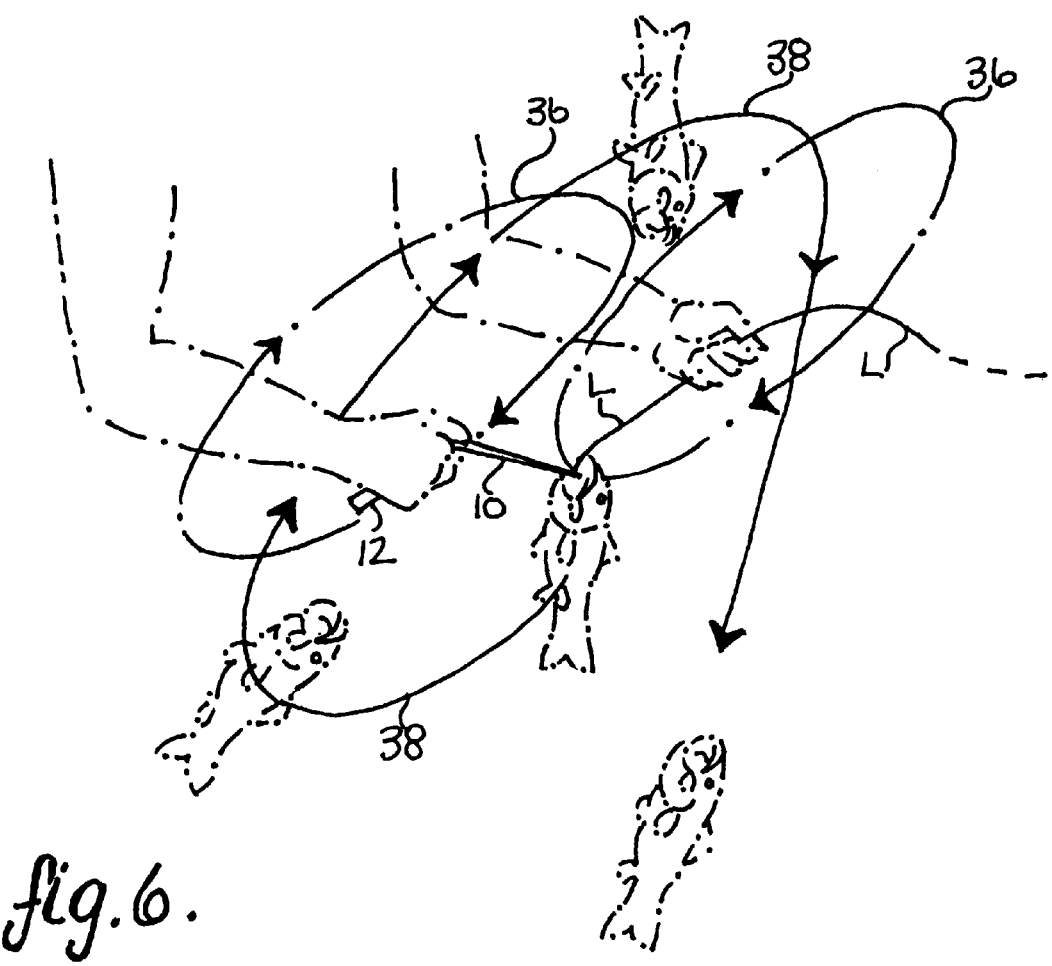
FIG. 6 is a reduced scale perspective view showing an alternate method of use of the fishhook remover of FIG. 1, wherein a fish and a user's arms are included for illustrative purposes only to depict unhooking the fish via twirling it in the given orbit.

To turn now to FIG. 6, an alternate method of using the fishhook remover includes twirling a hooked fish in a given orbit directly in front of the chest of the user as shown. The orbit for the fish is indicated by reference numeral 38. The motion for the user's hands to swing the fish through orbit is shown by is shown by a pair of oval circuits 36.

FIG. 6 depicts not a bass as shown in FIG. 4, but a relatively modest-sized or small trout. Removing hooks from small trout is generally problematic. Trout are hard to grasp. Trout are active, energetic fish covered all over their body by a slimy film. Thus trout easily squirt out of a fisherman's grasp. Squeezing harder to prevent the trout from squirting out thus, would likely harm the trout. The alternative of reaching a thumb inside the trout's mouth (as shown by FIG. 4 with reference to the bass therein) is often times not practicable. A small trout has a relatively small mouth. Given how wiggly a trout is, such a small mouth is small target which is not easily latched onto. Also, trout have sharp (albeit small) teeth. Inserting a thumb in the mouths of several trout in a day will eventually strip away the skin on the thumb's pad in tiny shreds.

Furthermore, a trout's slimy film is protection against infection. The slimy film, if touched by dry hands, will come off. Thoughtful fishermen generally wish to return trout to their fishing waters under the best circumstances for survival. This includes returning the fish with the slimy film intact and unharmed. As previously referred to, the slimy film protects the trout against infection and like microorganism invaders. To remove substantial portions of the slimy film will leave the trout exposed to possible diseases.

FIG. 6 and the figures that follow, show a method for a use of the remover tool 10 to unhook the trout or fish without directly handling it. In FIGS. 6–9, it assumed that the fisherman has caught and landed the fish by grabbing the line L in the left hand about 5 cm (12 inches) above hook H (see, e.g., FIG. 6). That is, the fisherman lifts the fish out of the water by the line L. The fisherman is then shown holding the remover tool 10 in the right hand, like a pistol.

Figure 7:
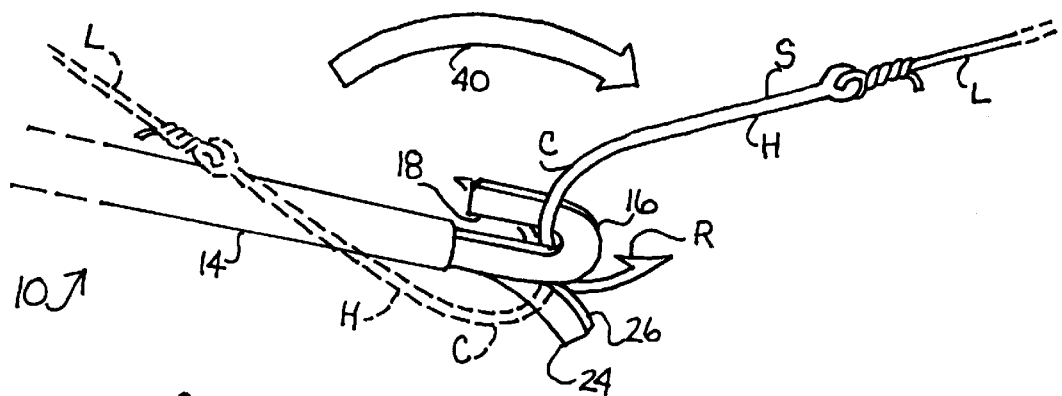

FIG. 7 shows the starting point for FIGS. 6–9. The orientation of the remover tool 10 and hook H, for the hook as shown in dashed lines, is the same as shown by FIG. 5. The forked end 26 is resting in the elbow C of hook H.

FIG. 7 then shows a changed position between the tool end 16/26 and hook H. What the fisherman has done is, pull the line L such that the hook H pivots in the direction of arc arrow 40. The end result is represented by the hook H in solid lines. The J-shaped end 16 and hook H are interlinked like how two links in a chain contact each other. Whereas a fish in not included in FIG. 7, it is understood that the fish dangles from the hook, with barb R buried into tissue somewhere in the fish's mouth. FIG. 6 shows the fisherman dangling the fish between his or her outstretched arms, with the remover tool 10 in the right hand and the line L in the left hand. The fish is carried between his or her outstretched arms, and dangles in the six o'clock position as shown.

Thus the user is ready to swing or twirl the fish in orbit 38 by moving his or her hands through circuits 36. FIG. 6 gives dashed line depictions of the fish to show its changed positions as it swings through the orbit 38 including, namely, an eight o'clock position on the upswing, a twelve o'clock position at the top of the swing, and an unhooked position below five o'clock as the fish falls free of the hook.

Figure 8:
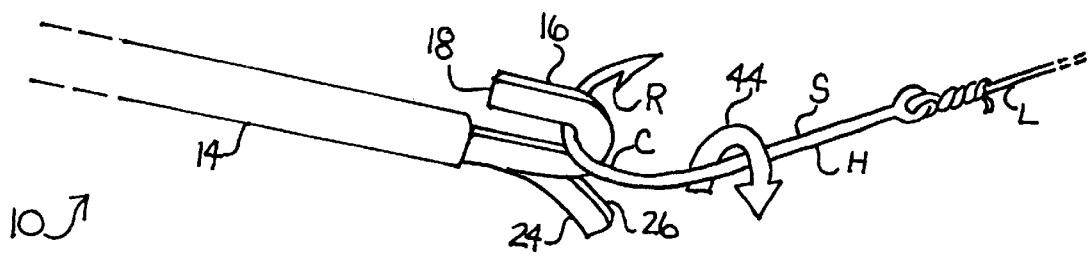
Figure 9:
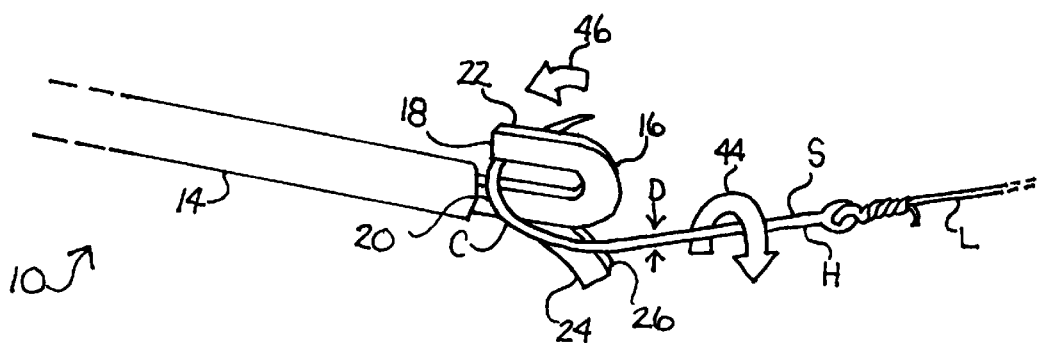

FIGS. 7 through 9 show various relative alignments between the J-shaped portion 16 of the remover tool 10 and the hook H as the fish is swung through the orbit 38 shown in FIG. 6. In FIGS. 7 through 9, the vantage point for these views is directly in front of the chest of the user, looking down at a shallow angle on the remover tool 10 and hook H. Nowhere in FIGS. 7–9 is the fish shown, but it is the fish's mass and/or momentum which spins the hook H clockwise in the figures relative to the end 16 of the remover tool 10.

In FIG. 7, the J-shaped portion 16 of the tool 10 and the hook H (as shown in solid lines) generally occupy transverse (or perpendicular planes) relative to each other. The elbow C of the hook H generally lies in a vertical plane.

FIG. 8 shows a changed position between the hook H and J-shaped portion 16. The hook H has pivoted from a position with the barb R down (FIG. 7) to the barb R up. Thus the hook H has pivoted half a turn clockwise as indicated by arc arrow 44. The change in position for the hook H between FIG. 7 and FIG. 8 corresponds to changes in the fish's position between dangling down in the six o'clock position (FIG. 6) and inverted in the twelve o'clock position at the top of the upswing (again, FIG. 6).

FIG. 9 shows a transition in the movement of the hook H relative to the J-shaped portion 16. Between FIGS. 7 and 8, the hook H's movement was mostly pivotal as indicated by arc arrow 44. In FIG. 9, the fish's momentum continues to pull the hook H to pivot along arc arrow 44. However, the elbow C of the hook H begins to bind in the U-shaped slot, and is forced out of the slot in the direction of arrow 46. The hook H then is corkscrewing relative to the J-shaped portion. The user has to resist the force of the hook H turning the J-shaped portion by locking his or her right wrist. In fact, the user can assist the hooks corkscrewing motion 44 and 46 by counter-rotating the remover tool 10 in the counterclockwise direction. The remover tool 10 allows the user to easily oppose the momentum of the hook H in the arc direction 44 because, the handle 12 (see FIG. 4) is shaped like a pistol stock, and, the flange 30 allows the user to rest his her thumb on the top of it and snap the tool 10 counterclockwise with a strong flip of his or her right wrist.

FIG. 9 shows the end result of the combined motions between the hook H and J-shaped portion 16. The hook barb R limits out against the outer leg 22 of the U-shaped slot 18. Thus the barb R and the pointed end of the hook H are reversed out of the tissue in the fish's mouth in which they are embedded. Ultimately, the fish falls free. The fish was unhooked without ever being directly touched.

The effectiveness of this maneuver is fairly sensitive to the size and configuration of the J-shaped portion 16, particularly the U-shaped slot 18 as defined between inner and outer legs 20 and 22. To begin with, the J-shaped portion 16 is more effective if the legs present relative sharp edges, as they do because the round coat hanger wire has been hammered into a square or rectangular cross-section (as previously described). The sharp edges apparently bite into the fishhook H and thereby promote the axial movement of the hook H along direction arrow 46 of FIG. 9. Also, the effectiveness of the slot 18 is dependent on its width between legs 20 and 22. It is preferred that the U-shaped slot should have 18 a width having an upper limit of less than five times or so a diameter D of the fishhook H. Naturally the lower limit of the width should be something greater than the diameter D of the fishhook H, plus allowances for clearance. A person having ordinary skill could reckon an appropriately sized U-shaped slot for a given fishhook easily through trial and error.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A fishhook remover for fishhooks tied to fishing line, comprising:

a pistol-grip handle;

a lateral-extending flange fixed to the pistol-grip handle, the flange arranged so that a user grasping the handle in one hand as a pistol can outstretch and rest his or her thumb of the same hand on the flange; and, an elongated shank that is fixed to the handle and extends forwardly from the handle to terminate in a forked end having divergent branches;

wherein one of the branches of the forked end is further configured with a J-shaped portion such that the forked end and J-shaped portion thereof are contained in a common plane, and that the J-shaped portion defines a rearwardly opening U-shaped slot;

wherein the forked end and the J-shaped portion are shaped and arranged to allow alternate methods of coupling with the fishhook elbow such that the forked end is shaped and sized to couple with the elbow of the fishhook by it resting against the elbow for thrust strokes, and that the J-shaped portion is shaped and sized to couple with the elbow of the fishhook by sling-hooking the elbow for pull strokes; and, wherein the J-shaped portion is further disposed relative to the forked end by virtue of being contained in the common plane, so as to allow transfer, without discontinuity, from (i) a given instance of coupling between the forked end and fishhook elbow, to (ii) a given instance of coupling between the J-shaped portion and fishhook elbow, by displacing the fishhook to sweep out generally a half-circle about the forked end.

2. The fishhook remover of claim 1, wherein the J-shaped end and the pistol-grip handle are contained in respectively transverse planes so that when the pistol-grip handle is held naturally as a pistol and thereby lies in a generally vertical plane, a barb of the hook can be oriented down relative to a shank of the hook.

3. The fishhook remover of claim 1, wherein the shank is formed from a sufficiently stiff material to prevent torsional deformation while twisting forces are being applied through the shank during use.

4. The fishhook remover of claim 1, wherein the flange allows the user, after he or she has rested the forked end in fishhook elbow and pulled the line above the hook tight to secure the fishhook elbow against the forked end, to clamp the line between the flange and his or her outstretched thumb so that the elbow of the fishhook remains pulled tightly in the forked end of the fishhook remover during use.

5. A fishhook remover for fishhooks tied to fishing line, comprising:

a handle; and, an elongated shank that is fixed to the handle and extends forwardly from the handle to terminate in a forked end having divergent branches;

wherein one of the branches of the forked end is further configured with a J-shaped portion such that the forked end and J-shaped portion thereof are contained in a common plane, and that the J-shaped portion defines a rearwardly opening U-shaped slot;

wherein the forked end and the J-shaped portion are shaped and arranged to allow alternate methods of coupling with the fishhook elbow such that the forked end is shaped and sized to couple with the elbow of the fishhook by it resting against the elbow for thrust strokes, and that the J-shaped portion is shaped and sized to couple with the elbow of the fishhook by sling-hooking the elbow for pull strokes; and, wherein the J-shaped portion is further disposed relative to the forked end by virtue of being contained in the common plane, so as to allow transfer, without discontinuity, from (i) a given instance of coupling between the forked end and fishhook elbow, to (ii) a given instance of coupling between the J-shaped portion and fishhook elbow, by displacing the fishhook to sweep out generally a half-circle about the forked end.

6. The fishhook remover of claim 5, wherein the shank is formed from a sufficiently stiff material to prevent torsional deformation while twisting forces are being applied through the shank during use.

* * * * *